US008442134B2

(12) United States Patent
Bury (10) Patent No.: US 8,442,134 B2
(45) Date of Patent: May 14, 2013

(54) POST DFT/FFT TIME TRACKING ALGORITHM FOR OFDM RECEIVERS (75) Inventor: Andreas Gerhard Bury, Dresden (DE)

(73) Assignee: NXP B.V., Eindhoven (NL)

( * ) Notice: Subject to any disclaimer, the term of this patent is extended or adjusted under 35 U.S.C. 154(b) by 320 days.

(21) Appl. No.: 12/812,604

(22) PCT Filed: Jan. 12, 2009

(86) PCT No.: PCT/IB2009/050096
§ 371 (c)(1),
(2), (4) Date: Jul. 15, 2010

(87) PCT Pub. No.: WO2009/093147
PCT Pub. Date: Jul. 30, 2009

(65) Prior Publication Data
US 2010/0290569 A1 Nov. 18, 2010

(30) Foreign Application Priority Data

Jan. 22, 2008 (EP) .................................... 08100784

(51) Int. Cl.
H04K 1/10 (2006.01)
H04L 27/28 (2006.01)
(52) U.S. Cl.
USPC ................. 375/260; 455/59; 455/60; 455/61; 370/464; 370/480; 370/496
(58) Field of Classification Search .................... None
See application file for complete search history.

(56) References Cited

U.S. PATENT DOCUMENTS 6,947,505 B2 * 9/2005 Learned ......................... 375/346
7,298,806 B1 * 11/2007 Varma et al. ................... 375/354
7,450,634 B2 * 11/2008 Miller et al. ................... 375/229
7,643,538 B2 * 1/2010 Currivan et al. ............... 375/144
2006/0088116 A1 * 4/2006 Chen et al. ..................... 375/260
2007/0153922 A1 * 7/2007 Dong et al. ..................... 375/260
2008/0267273 A1 10/2008 Aue

FOREIGN PATENT DOCUMENTS

WO 02/45333 A 6/2002
WO 2007/069199 A2 6/2007

OTHER PUBLICATIONS

Ryu, Young-Jae, et al "Timing Phase Estimator Overcoming Rayleigh Fading for OFDM Systems," IEEE Trans. on Consumer Electronics, vol. 47, No. 3, pp. 370-377 (Aug. 2001).
Chen, Hou-Shin, et al. "Novel Sampling Clock Offset Estimation for DVB-T OFDM," Proc. IEEE VTC 2003-Fall, vol. 4, pp. 2272-2276 (2003).

(Continued)

Primary Examiner — Shuwang Liu
Assistant Examiner — Gina McKie (57) ABSTRACT

Synchronization tracking in an orthogonal frequency division multiplexing (OFDM) receiver by obtaining a DFT output vector; determining a sample timing offset indication using reference symbols extracted from the DFT output vector; and adapting the OFDM symbol timing using said determined indication. To provide an improved post-DFT algorithm for estimating time tracking error in OFDM receivers the determining includes (a) estimating the channel transfer function at equidistant frequency positions using said reference symbols, for a first OFDM symbol; determining plural frequency correlations for said equidistant frequency positions for said OFDM symbol; (c) repeating steps (a) and (b) for subsequent OFDM symbols; (d) linearly combining said plural frequency correlations for said plural OFDM symbols obtained in steps (a) through (c), for obtaining said sampling clock offset indication wherein the linear combining uses nonzero weights only. An OFDM receiver circuit arrangement performing this method.

20 Claims, 6 Drawing Sheets

OTHER PUBLICATIONS

Palin, Arto, et al "Symbol Synchronization in OFDM System for Time Selective Channel Conditions," Electronics, Circuits & Systems, vol. 3, IEEE, pp. 1581-1584 (1999).

Speth, Michael, et al "Optimum Receiver Design for OFDM-Based Broadband Transmission—Part II: A Case Study," IEEE Trans. on Comms., vol. 49, No. 4, pp. 571-578 (Apr. 2001).

Weinstein, S. B., et al; "Data Transmission by Frequency-Division Multiplexing Using the Discrete Fourier Transform"; IEEE Trans. on Comm. Techn.; vol. COM-19, No. 5, pp. 628-634 (Oct. 1971).

International Search Report and Written Opinion for International Patent Appln. No. PCT/IB2009/050096 (Jan. 12, 2009).

* cited by examiner

POST DFT/FFT TIME TRACKING ALGORITHM FOR OFDM RECEIVERS

BACKGROUND OF THE INVENTION

The present invention relates to a method for time synchronization tracking in broadband transmission systems. More particular, the invention relates to an algorithm for post-DFT time synchronization tracking in OFDM receivers. The present invention further relates to a system for performing a time synchronization tracking method within an OFDM receiver.

Orthogonal frequency division multiplexing (OFDM) has become a popular transmission method for high-speed wireless radio transmission, due to its potential for low complexity of transmitters and receivers, paired with robustness under severe multipath conditions. A more detailed discussion on OFDM is found in S. B. Weinstein and P. M. Ebert: Data transmission by frequency-division multiplexing using the discrete Fourier transform. IEEE Trans. Communication Technology, COM-19(5):628-634, October 1971.

In OFDM, a large number of closely-spaced orthogonal subcarriers are used to carry data. Each subcarrier is modulated with a linear modulation scheme (such as quadrature amplitude modulation (QAM) or phase shift keying) at a low symbol rate.

The orthogonality of the OFDM subcarriers allows for efficient modulator and demodulator implementation using inverse discrete Fourier transformation (IDFT) on the transmitter side for conversion of the signal into the time domain, and DFT on the receiver side for conversion back into the frequency domain.

Continuous reception of OFDM signals, such as in a receiver for the European digital terrestrial video broadcasting standard (DVB-T; Digital Video Broadcasting-Terrestrial; ETSI EN 300744, V1.5.1: Digital Video Broadcasting (DVB); "Framing Structure, channel coding and modulation for digital terrestrial television", European Standard, European Telecommunications Standards Institute, 2004) requires continuous adaptation of the receiver sample time synchronization with respect to the transmitter sample timing which is referred to as time tracking, in order to prevent interference between subsequent OFDM symbols (inter-symbol interference—ISI) as well as inter-carrier interference (ICI) within individual OFDM symbols.

To avoid inter-symbol interference (ISI) in multipath fading channels, a guard interval is inserted prior to the IDFT block. During this interval, a cyclic prefix is transmitted which consists of the end of the IDFT output copied into the guard interval. If there is no multipath propagation, the receiver can select the time synchronization within a window that is the size of the cyclic prefix.

In multipath propagation environments, a transmitted signal reaches the receiver through multiple paths each of which may introduce a different delay, magnitude and phase thereby enlarging the transition time from one symbol to the next. Identifying the useful part of an OFDM symbol that contains minimum interference from adjacent symbols (inter-symbol interference) is a time synchronization task to be performed by the receiver. This task is critical to the overall receiver performance.

Time synchronization may be classified into two main categories: acquisition and tracking. Symbol time acquisition defines the task of initially finding the correct timing. Often, the symbol time acquisition is divided into two or more steps, where in the first step, coarse time synchronization is achieved. In the following steps, the time window is refined. For those successive steps, similar or identical algorithms that are used for tracking are often applied. Tracking defines the task of continuously adjusting the time window in the course of continuous reception to keep the time window at its optimum location.

Time tracking is crucial for the overall system performance. For OFDM, various methods for time tracking have been proposed. The known methods may be grouped into data assisted and non-data assisted tracking, and pre-DFT or post-DFT time tracking. Data assisted tracking makes use of known symbols in OFDM, e.g. reference symbols, also known as pilot symbols, or preambles, whereas non-data assisted tracking makes use of the correlation properties of the signal.

In DVB-T which is aimed at continuous reception, the standard does not define any preambles. Reference symbols are included in the multiplex, the standard defining so-called scattered pilots at every $12^{th}$ carrier, and a smaller number of continual pilots that are present at fixed carrier locations.

Those pilot symbols are only accessible after DFT and only after some coarse time synchronization has already been established. Therefore, most initial time synchronization algorithms for DVB-T/H use the auto-correlation properties of the OFDM symbols with its cyclic extension for coarse symbol time estimation and then rely on the pilots for fine time synchronization and tracking.

Some pre-DFT, time-domain based, time tracking techniques that make use of the auto-correlation properties have been found to require relatively long averaging times to yield adequate results. Another disadvantage is that after the signal has been acquired those types of calculations are not required elsewhere in the receiver. Additionally, the performance under heavy multipath is not satisfying. Other known approaches aim to further improve the time domain correlation based method typically used for coarse time synchronization.

Two basic approaches for post-DFT based time tracking are known both using an estimate of the channel transfer function:

SUMMARY OF THE INVENTION

In a first approach, the estimated channel transfer function is transferred back into the time domain by means of an IDFT to obtain an estimate of the channel impulse response from the estimated channel transfer function. Afterwards an energy search is performed on the estimated channel impulse response. This method, however, is computationally intensive and requires additional memory.

An alternative approach for post-DFT based time tracking, therefore, is to calculate the average phase difference from one scattered pilot to the next thereby estimating the mean slope of the channel transfer function. This is based on the property of the DFT that a delay in time domain corresponds to a phase proportional to the carrier index and proportional to the delay in time domain. Therefore, in single paths channels, the time delay may be directly estimated from the slope. Such algorithms is described, e.g. by Young-Jae Ryu, Dong-Seog Han in "Timing phase estimator overcoming Rayleigh fading for OFDM systems", IEEE Trans. Consumer Electronics, vol. 47, issue 3. August 2001, pp. 370-377, and by Hou-Shin Chen, Yumin Lee, in "Novel sampling clock offset estimation for DVB-T OFDM", Proc. IEEE VTC 2003-Fall, vol. 4, pp. 2272-2276.

This simple method using the estimate of the mean value of the slope of the channel transfer function, while giving satisfactory results in channels with low delay spread, has been found to give no adequate results under heavy multipath conditions as can be experienced in single frequency networks (SFNs). Experiments have shown that this method does not withstand tests for guard interval utilization in SFNs. One reason for this is that the simple pilot phase slope based estimators target at moving the center of gravity of the channel impulse response to a certain position. However, if the channel impulse response is longer than half the guard interval, the simple method will essentially result in pulling the strong path into the middle of the guard interval, while the smaller path moves out of the guard window, causing inter-symbol interference.

An object of the invention is to provide an improved post-DFT algorithm for estimating a time tracking error in OFDM receivers such as to allow an effective time tracking even in single frequency networks. A more particular object of the invention is to devise a time tracking algorithm for OFDM receivers that supports longer channel impulse responses without causing inter-symbol interference.

This object is achieved by an algorithm as claimed in claim 1 and by a circuit arrangement as claimed in claim 13 or claim 14.

The reference-symbol based time synchronization tracking method for orthogonal frequency division multiplexing (OFDM) receivers according to the present invention operates on DFT output vectors and computes an indication of the direction where the OFDM symbol timing should be shifted to, and the OFDM symbol timing is shifted by enlarging or decreasing the number of samples which are removed between DFT input bocks, i.e. the block length of the guard interval removal is enlarged or reduced, depending on the shift direction. Alternatively to perform a discrete time shift to adapt the timing, the ADC clock may be controlled or the conversion ratio of a sample rate converter may be controlled to change the timing.

A plurality of frequency correlations is determined at equidistant frequency positions for each of a number of subsequent OFDM symbols, and the obtained frequency correlations are linearly combined to obtain the time synchronization offset indication.

The method according to the invention can be viewed as an enhancement of the simple pilot phase slope based estimators of Young-Jae Ryu, Dong-Seog Han, and Hou-Shin Chen, Yumin Lee mentioned above. In contrast to these slope based estimators the estimator according to the invention instead of aiming to move the center of gravity of the channel impulse response to a certain position targets to keep the channel impulse energy within certain time limits. The method according to the invention is beneficial in particular for long channel impulse responses with much energy on one end and little energy on the other end. The method of the invention advantageously supports longer channel impulse responses without causing inter-symbol interference.

BRIEF DESCRIPTION OF THE DRAWINGS

Additional features and advantages of the present invention will be apparent from the following detailed description of specific embodiments which is given by way of example only and in which reference will be made to the accompanying drawings, wherein.

In the drawings the same or equivalent components are designated with equivalent reference numerals with the last two digits thereof being the same for similar or equivalent elements.

DESCRIPTION OF THE DRAWINGS

Figures 1, 2:
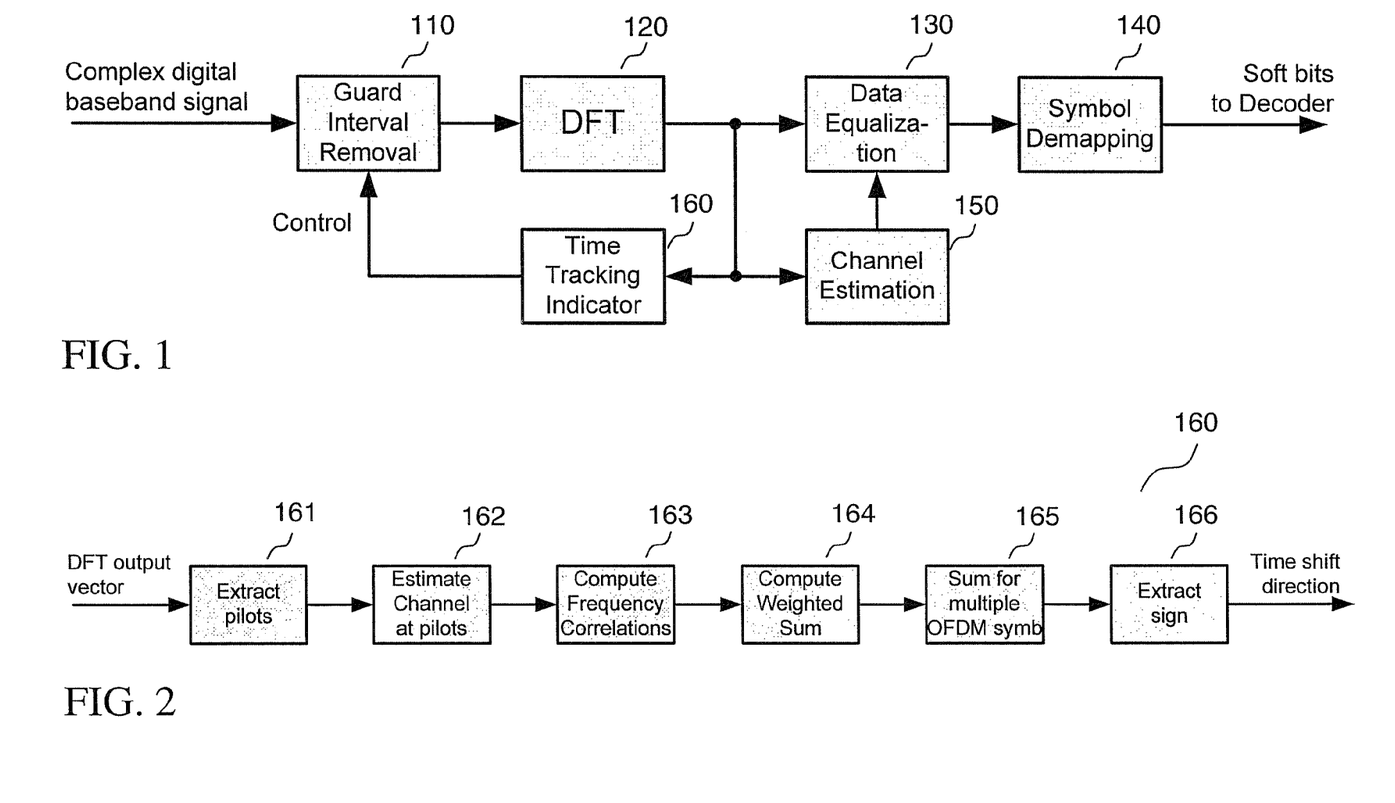
FIG. 1 illustrates a simplified block diagram of an OFDM receiver circuit with a time tracking indicator unit.
FIG. 2 shows a first preferred embodiment of the time tracking unit of FIG. 1 according to the invention in greater detail.

FIG. 1 shows a simplified schematic block diagram of a part of an OFDM receiver, in which the proposed time tracking according to the invention may be incorporated. Blocks as long as the DFT length are extracted from the received complex digital baseband signal, separated by unused blocks as long as the OFDM guard interval (110). The DFT is processed on each of the useful blocks (120), each time yielding a vector of received data and pilot symbols in the frequency domain. Pilot symbols are known transmit symbols which are provided to the receiver for various parameter estimation tasks including channel estimation (150). The computed channel estimate of one DFT output vector is used to equalize (130) the data symbols of this vector. Equalized symbols are fed to the QAM demapper (140) and finally to the decoder.

Figure 3:
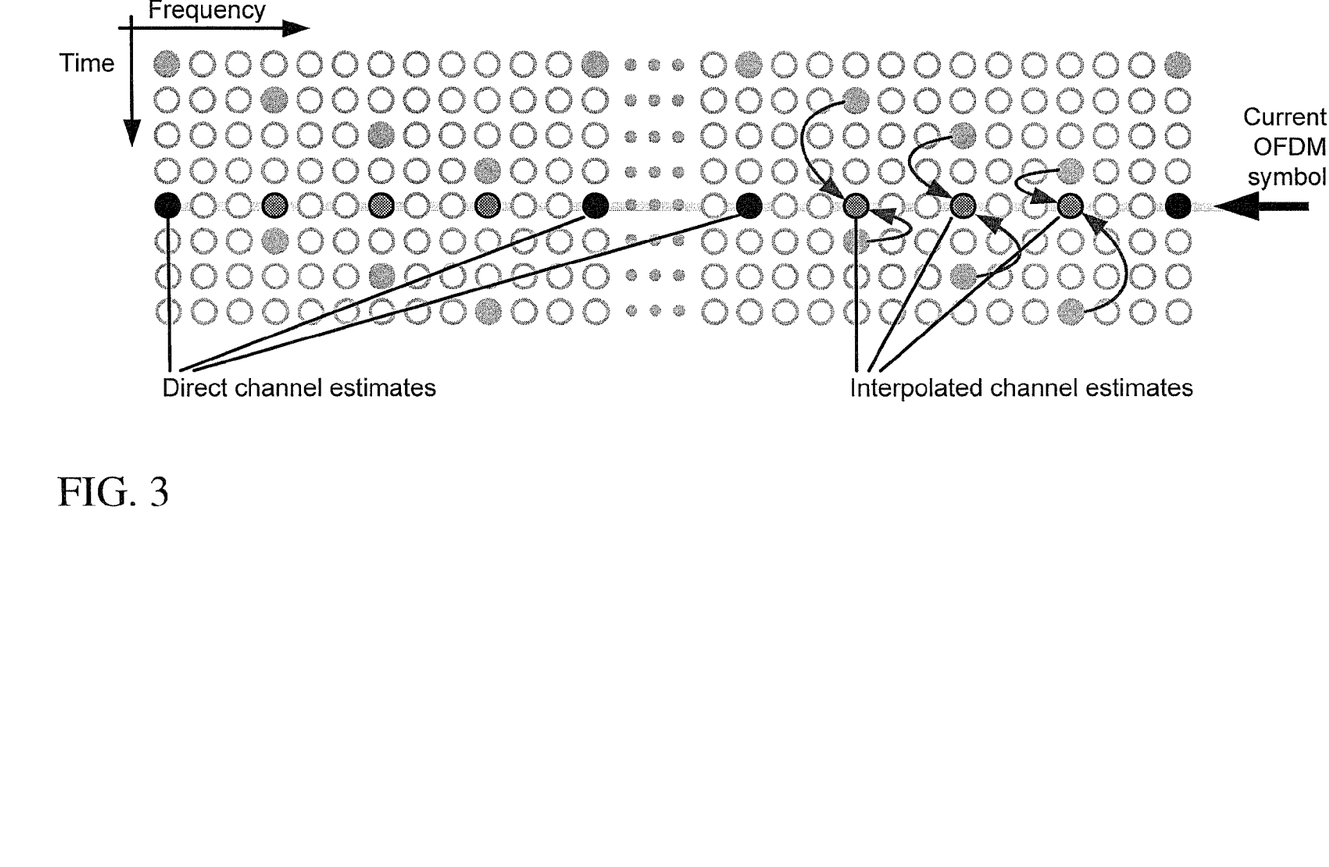
FIG. 3 illustrates both the pilot symbol structure and channel estimates at pilot positions, for the case of DVB-T, ETSI EN 300744.

FIG. 2 shows a block diagram of a first preferred embodiment of the proposed time tracking method according to the invention in greater detail. Pilot symbols in the DFT output vector are extracted (161) and used to compute a channel transfer function estimate (162) at the respective pilot symbol positions. For illustrating an example of pilot symbol extraction, FIG. 3 shows the DVB-T pattern of scattered pilots. In addition to estimate the channel transfer function directly from the pilots of the current OFDM symbol, channel transfer function estimates at other than the pilot positions of the current OFDM symbols may be computed employing interpolation in time direction which is also illustrated in FIG. 3.

Channel transfer function estimates at the described positions are then used to compute an auto correlation function in frequency direction (163), at a specific set of small frequency offsets; only the imaginary parts of these correlations are needed. A weighted sum of the obtained set of correlation values is computed (164), resulting in a scalar value. This value indicates where the timing should be shifted to. Multiple averages in time direction are computed, and the sign of the value indicates the direction of the next time shift operation to be performed. In the simplest form of the algorithm, the amount of the time shift is constant, i.e. constitutes a preset value, but it is also possible to exploit the absolute value of the indicator output to control the amount of the time shift.

Figure 4:
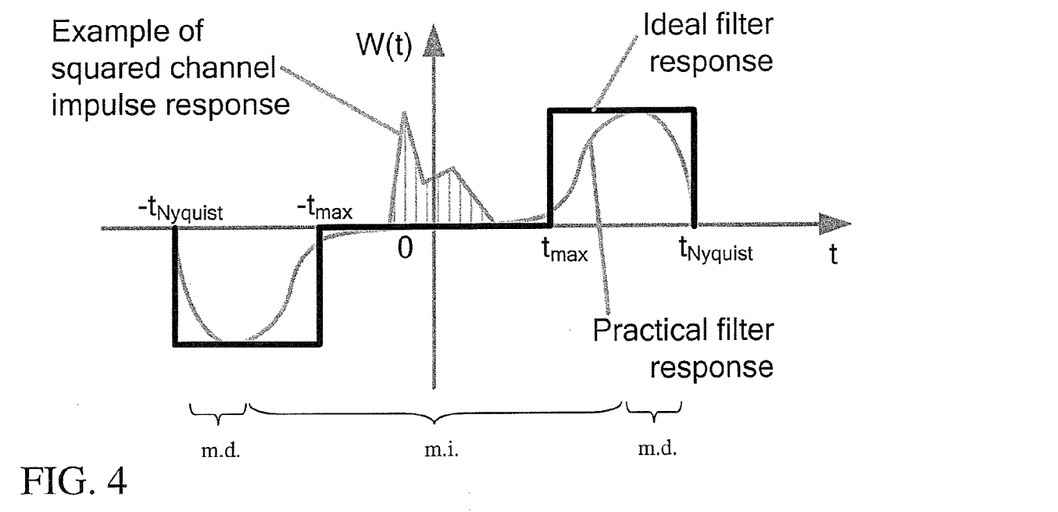
FIG. 4 illustrates the response of the weighting filter that is applied to frequency correlations according to the invention, in the time domain.

The weighting coefficients effectively define a high pass filter whose frequency response is shown in FIG. 4. It has to be noted that this filter is applied on frequency correlation values, so the filter "frequency response" is given versus time positions. The shape of this weighting filter transfer function describes an S-curve with a flat section in the middle. In other words, the weighting pattern employed comprises a monotonically increasing (m.i.) central portion flanked by a respective monotonically decreasing (m.d.) portion, with the monotonically increasing portion comprising a substantially constant portion having a length slightly smaller than the length of a guard interval of the respective OFDM symbol. In the preferred embodiment illustrated in FIG. 4 this substantially constant portion of the weighting pattern is a zero region.

Figure 5:
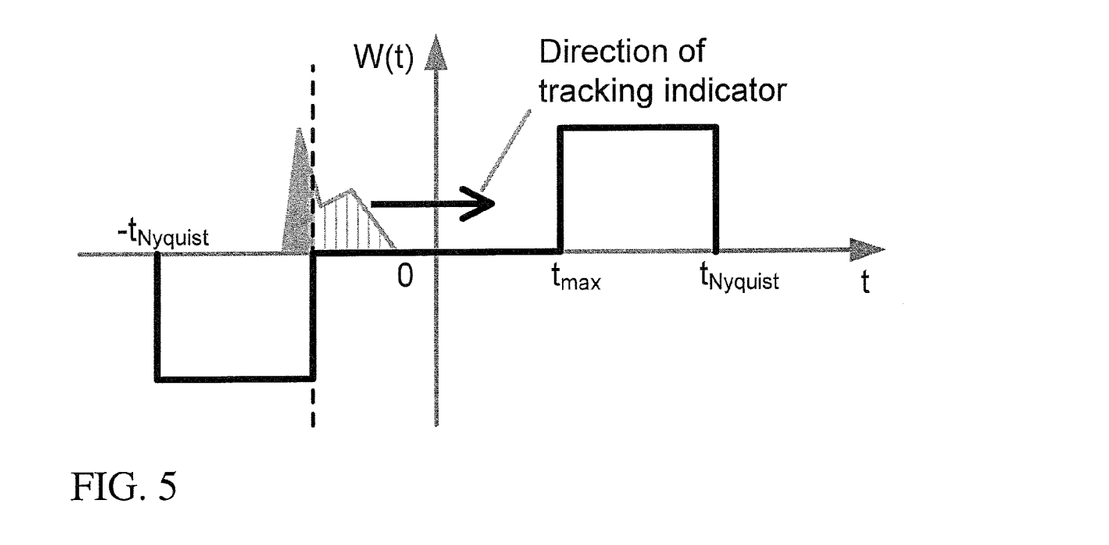
FIG. 5 illustrates indication of the time tracking indicator block for shifting the timing.

The zero region determines the time range where the channel impulse response is allowed to have energy. If some energy of the channel impulse response falls beyond the flat region, as is illustrated in FIG. 5, the estimated indication will indicate to shift the timing such that all energy falls into the zero region.

The above considerations may be expressed in mathematical form as follows:

Let $F(\cdot)$ denote the Fourier transform and $F^{-1}(\cdot)$ the inverse Fourier transform.

The channel impulse response h(t) is the inverse Fourier transform of the channel transfer function H(f):

$$h(t)=F^{-1}(H(f)) \Leftrightarrow H(f)=F(h(t)).$$

Thus, the squared channel impulse response is the inverse Fourier transform of the autocorrelation function of the channel transfer function:

$$|h(t)|^2 = h(t) \cdot h^*(t) = F^{-1}(H(f) \cdot H^*(-f)).$$

An integration over the weighted squared channel impulse response corresponds, in the frequency domain, to an integration of the weighted autocorrelation function (ACF) of the channel transfer function, $$\int h(t) \cdot h^*(t) \cdot w(t) dt = \int [H(f) \cdot H^*(-f)] W(f) df,$$

wherein the weighting applied to this autocorrelation function is the Fourier transform of the weighting applied to the impulse response:

$$W(f)=F(w(t)) \Leftrightarrow w(t)=F^{-1}(W(f)).$$

The weighting applied to the squared impulse response, w(t), has a shape as shown in FIG. 4, so the weighting applied to the ACF of the channel transfer function, W(f), has a shape which is the Fourier transform of the weighting pattern shown in FIG. 4 in a time domain representation.

Evaluating the ACF of the channel transfer function over this weighting function W(f) yields an indication of the direction where the timing should be shifted to in order to have all energy of the channel impulse response located in the zero portion of the weighting filter response, as may be seen from FIGS. 4 and 5:

$$I=\int [H(f) \cdot H^*(-f)] \cdot W(f) df.$$

The sign of the value I indicates the direction where to shift the timing.

Given the above considerations an embodiment of the inventive method will be described in detail with reference to FIG. 2, using the following notation:

c(l,k): transmitted symbols before IDFT y(l,k): received symbols at DFT output l: OFDM symbol index in time direction, k: OFDM subcarrier index in frequency direction.

H(l,k): estimated channel transfer function values.

With the pilot symbols extracted, direct channel estimations are computed (162) at the pilot positions wherein the applicable pairs (l,k) are determined by the pilot pattern as shown in FIG. 3:

$$H_{direct}(l,k)=y(l,k)/c(l,k).$$

Further, time-interpolated channel estimates are computed wherein the applicable pairs (l,k) are determined by the pilot pattern as shown in FIG. 3:

$$H_{interp}(l,k) = \sum_{n \in O} a_n \cdot H_{direct}(l-n, k),$$

with O being the set of offset positions in time direction where direct channel estimates are available and $a_n$ being a set of interpolation coefficients.

The combined set of direct and time-interpolated channel estimates, $H(l,k_{channel})$, within the OFDM symbol has to be chosen such that exploited channel estimates are equidistantly spaced in frequency direction (all integers):

$$k_{channel}=k_0+n \cdot K \vee n \in \{n_1, n_1+1, n_1+2, \ldots, n_2\},$$

with K being the constant spacing between two adjacent frequency positions where a channel estimate is available, and $k_0$ being a constant offset. Preferably, K is chosen to be smaller than a ratio of the DFT length to the guard interval length.

Subsequently, frequency correlations are computed (163) for OFDM symbol l, $$C(l, n) = \frac{1}{1+n_2-n_1-n} \cdot \sum_{m=n_1}^{n_2-n} Im\{H(l, k_0+m \cdot K) \cdot H^*(l, k_0+(m+n) \cdot K)\},$$

for a small number of values, $n \in \{1, 2, \ldots n_c\}$.

A sum of weighted frequency correlations is calculated (164), $$S(l) = \sum_{n=1}^{n_C} W(n) \cdot C(l, n),$$

with W(n) being the weighting pattern with a frequency response as shown in FIG. 4 and described above, which determines the time interval where the impulse response energy shall be located.

Steps 162 to 164 are repeated for a plurality of pilot symbols, and averaging of the calculated sums in time direction yields an indicator $$I = \frac{1}{1 + l_2 - l_1} \cdot \sum_{l=l_1}^{l_2} S(l),$$

from where a sign may be extract that gives the direction of the timing shift to be performed.

It is also possible to reverse the steps of weighting and averaging, i.e. to first calculate an average for each of a set of frequency correlations obtained for a number of subsequent pilot symbols prior to determine a weighted sum from the averaged frequency correlations to obtain the indicator. This process of weighting and averaging effectively constitutes a linear combination operation for the obtained frequency correlations, wherein only the non-zero weights are used.

Figure 6:
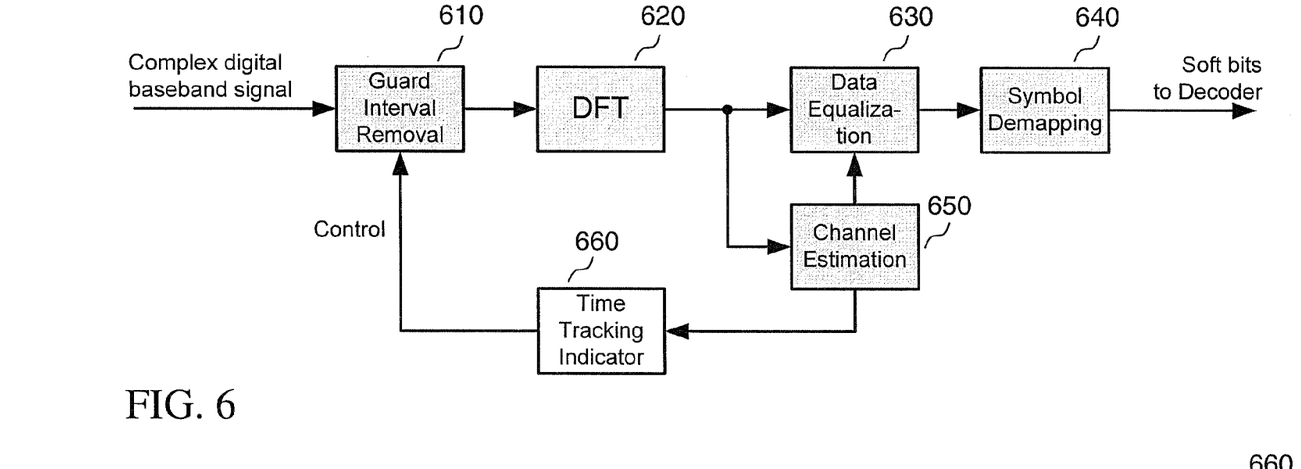
FIG. 6 shows a simplified block diagram of a second preferred embodiment of an OFDM receiver circuit with a time tracking indicator unit according to the invention in a merged implementation.
Figure 7:
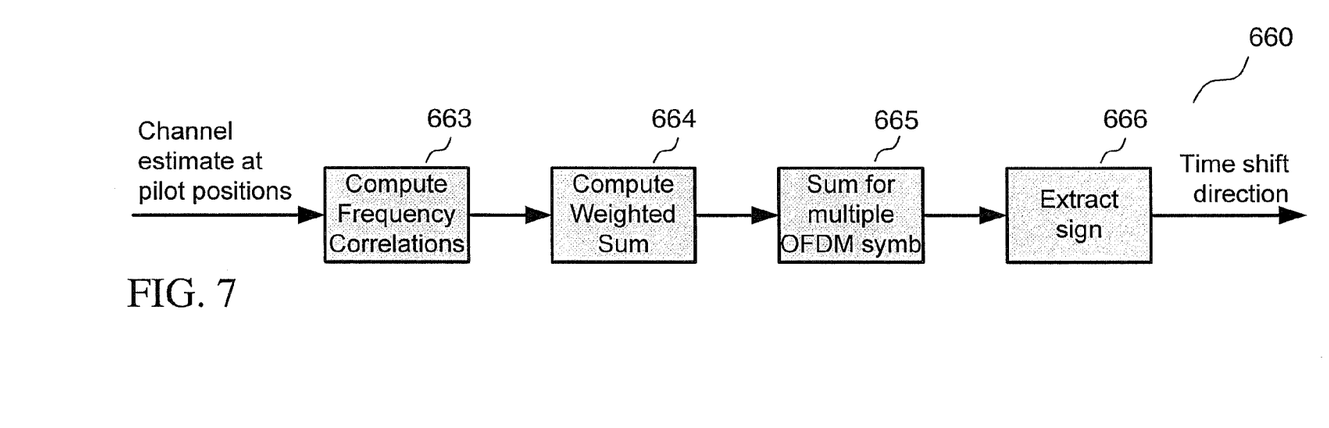
FIG. 7 shows the time tracking unit of FIG. 6 according to the invention in greater detail.

In another embodiment of the method according to the invention a part of the time tracking unit described in conjunction with FIG. 2 may be implemented within the channel estimation unit of the OFDM receiver which is designated with 130 in FIG. 1. In this case, a simplified implementation of the time tracking unit takes channel estimates at pilot positions directly from the channel estimator 650 as shown in FIG. 6, and the time tracking indicator unit 660 hence is reduced to what is shown in FIG. 7, wherein the same principles are applied as described above in conjunction with blocks 163 to 166 of FIG. 2.

Figure 8:
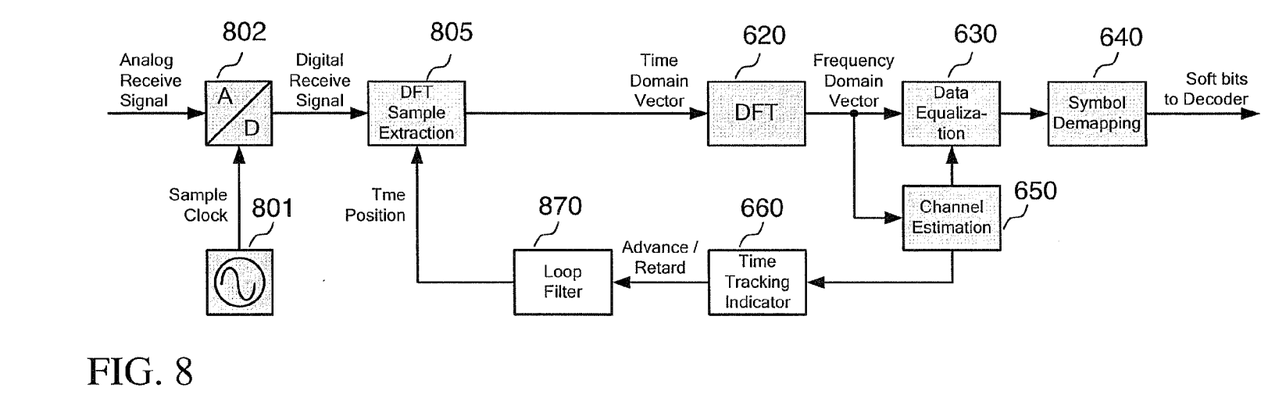
FIG. 8 shows a detailed block diagram of an implementation example of the method according to the invention illustrated in FIGS. 6 and 7 that employs control of the DFT sample extraction time.
Figure 9:
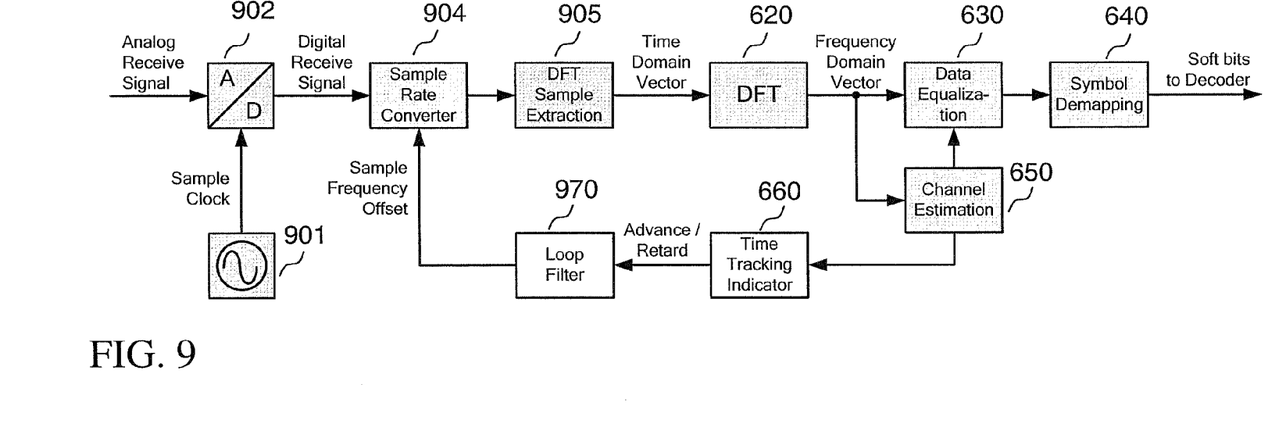
FIG. 9 shows a detailed block diagram of another implementation example of the inventive method according to FIGS. 6 and 7 that employs control of the sampling frequency via a sample rate converter.
Figure 10:
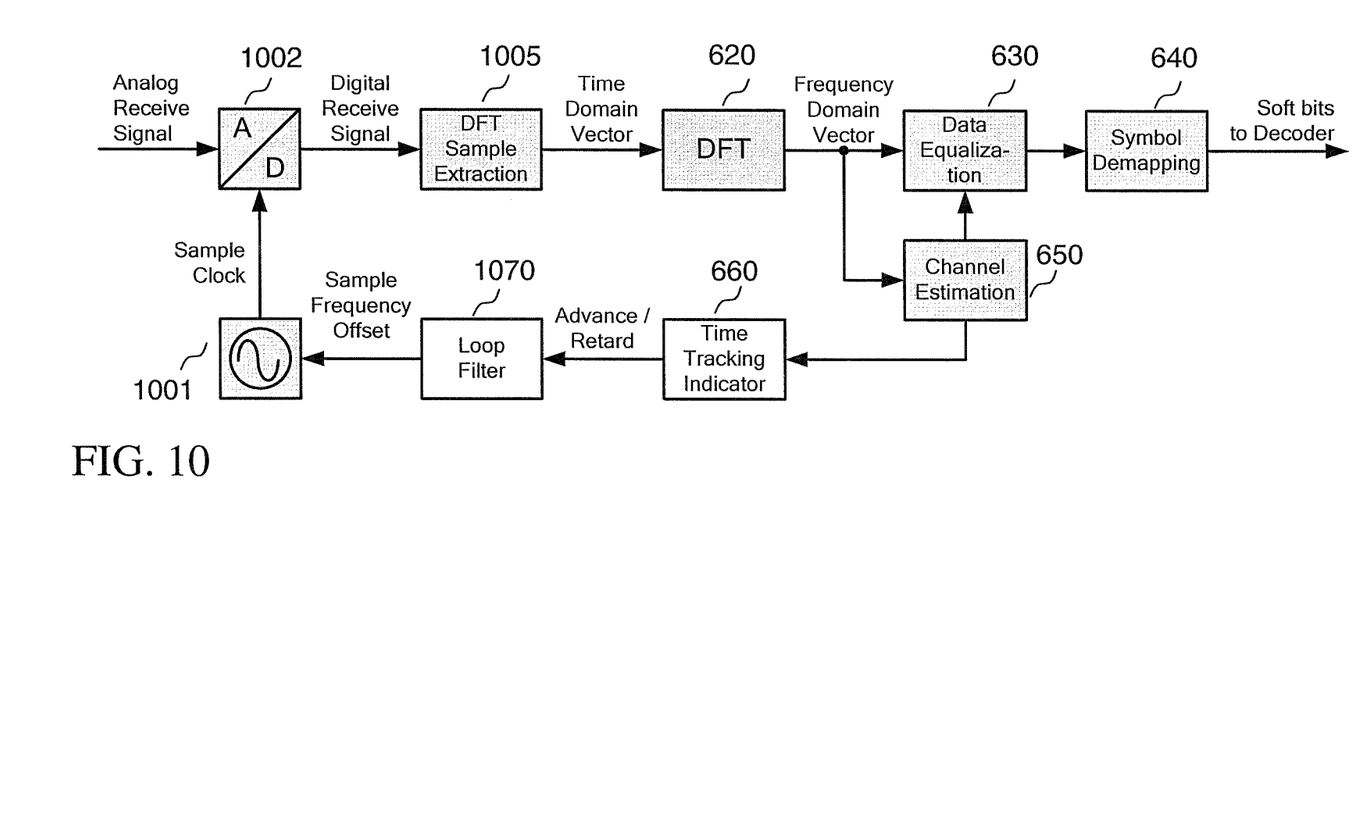
FIG. 10 shows a detailed block diagram of a further implementation example of the inventive method according to FIGS. 6 and 7 that employs control of the sampling frequency via the sample clock oscillator.

FIGS. 8, 9 and 10 illustrate different embodiments for implementing the DFT window shift employing the described time tracking method. Common to these three examples is the time tracking indicator function. Each of the embodiments illustrated in FIGS. 8 to 10 are based upon the merged channel estimator/time tracking indicator implementation of FIGS. 6 and 7. However, it has to be appreciated that each of these embodiments could equally be employed in conjunction with the time tracking method of FIGS. 1 and 2 that performs the time tracking indicator determination separately from channel estimation. In any case, DFT unit 620, data equalization unit 630, symbol demapping unit 640, and channel estimation unit 650 are the same or equivalent to those described in conjunction with FIGS. 1 and 6 and therefore a description thereof will not be repeated. Different to these three implementation examples is the approach to control the timing adjustment within the time tracking loop.

In FIG. 8, the timing adjustment is performed by directly changing the time position within DFT sample extraction unit 805 where DFT input samples are extracted. There, the length of the discarded OFDM cyclic prefix is increased or reduced according to the time tracking indicator which is determined in unit 660 to modify the timing. In this arrangement loop filter 870 is an ideal integrator, which converts the advance/retard information into an absolute time position. In this embodiment, the sample clock for A/D converter 802 generated by sample clock generator 801 is kept at a fixed frequency.

The arrangement of FIG. 9 additionally contains a sample rate converter 904. By slightly changing the conversion ratio for a certain period of time the time position where DFT samples are extracted will be shifted slowly. Here, loop filter 970 converts the advance/retard information from time tracking indicator 960 into a sample frequency offset value, which is applied to sample rate converter 904 for a specific amount of time to shift the timing.

The arrangement of FIG. 10 does not comprise a sample rate converter but uses a similar control mechanism as in FIG. 9. Instead of changing the conversion ratio in a sample rate converter, the sample clock of A/D converter 1002 is directly modified in sample clock generator 1001 using frequency offset information from loop filter 1070 which follows time tracking indicator 1060.

The invention claimed is:

1. A method for time synchronization tracking in an orthogonal frequency division multiplexing (OFDM) receiver, the method comprising:
   obtaining a discrete Fourier transformation (DFT) output vector;
   determining a sample timing offset indication using reference symbols that are extracted from the obtained DFT output vector; and adapting an OFDM symbol timing using said determined sample timing offset indication, wherein said determining step further comprises:
   (a) estimating a channel transfer function at equidistant frequency positions using said reference symbols, for a first OFDM symbol;
   (b) determining a plurality of frequency correlations for said equidistant frequency positions for said first OFDM symbol;
   (c) repeating steps (a) and (b) for a plurality of subsequent OFDM symbols; and
   (d) linearly combining said plurality of frequency correlations for said plurality of OFDM symbols obtained in steps (a) through (c), for obtaining the sample timing offset indication wherein the linear combining uses non-zero weights only,
   wherein step (d) comprises, for each set of frequency correlations determined for said plurality of OFDM symbols in steps (b) and (c):
   weighting said plurality of determined frequency correlations with a weighting pattern; and
   calculating sums of said weighted plurality of determined frequency correlations; and then
   averaging the calculated sums for said plurality of OFDM symbols to obtain said sample timing offset indication.

2. The method of claim 1, wherein said equidistant frequency positions in step (a) comprise a combined set of directly estimated reference symbols and time-interpolated reference symbols equidistantly positioned within a row grid of frequency positions.

3. The method of claim 1, wherein a spacing of said equidistant frequency positions is smaller than a ratio of a length of a DFT window to a length of a guard interval of said OFDM symbol.

4. A method for time synchronization tracking in an orthogonal frequency division multiplexing (OFDM) receiver, the method comprising:
   obtaining a discrete Fourier transformation (DFT) output vector;
   determining a sample timing offset indication using reference symbols that are extracted from the obtained DFT output vector; and
   adapting an OFDM symbol timing using said determined sample timing offset indication, wherein said determining step further comprises:
   (a) estimating a channel transfer function at equidistant frequency positions using said reference symbols, for a first OFDM symbol;
   (b) determining a plurality of frequency correlations for said equidistant frequency positions for said first OFDM symbol;
   (c) repeating steps (a) and (b) for a plurality of subsequent OFDM symbols; and
   (d) linearly combining said plurality of frequency correlations for said plurality of OFDM symbols obtained in steps (a) through (c), for obtaining the sample timing offset indication wherein the linear combining uses non-zero weights only, wherein step (d) comprises:
averaging each set of said plurality of frequency correlations determined for said plurality of OFDM symbols in steps (b) and (c);
weighting said plurality of averaged frequency correlations with a weighting pattern; and
calculating sums of said weighted plurality of averaged frequency correlations to obtain said sample timing offset indication.

5. A method for time synchronization tracking in an orthogonal frequency division multiplexing (OFDM) receiver, the method comprising:
obtaining a discrete Fourier transformation (DFT) output vector;
determining a sample timing offset indication using reference symbols that are extracted from the obtained DFT output vector; and
adapting an OFDM symbol timing using said determined sample timing offset indication, wherein said determining step further comprises:
(a) estimating a channel transfer function at equidistant frequency positions using said reference symbols, for a first OFDM symbol;
(b) determining a plurality of frequency correlations for said equidistant frequency positions for said first OFDM symbol;
(c) repeating steps (a) and (b) for a plurality of subsequent OFDM symbols; and
(d) linearly combining said plurality of frequency correlations for said plurality of OFDM symbols obtained in steps (a) through (c), for obtaining the sample timing offset indication wherein the linear combining uses non-zero weights only,
wherein a weighting pattern employed in step (c) comprises, in a time domain representation, a monotonically increasing portion including a substantially zero portion with a length slightly smaller than a length of a guard interval of said OFDM symbol, and flanked by a respective monotonically decreasing portion.

6. A method for time synchronization tracking in an orthogonal frequency division multiplexing (OFDM) receiver, the method comprising:
obtaining a discrete Fourier transformation (DFT) output vector;
determining a sample timing offset indication using reference symbols that are extracted from the obtained DFT output vector; and
adapting an OFDM symbol timing using said determined sample timing offset indication, wherein said determining step further comprises:
(a) estimating a channel transfer function at equidistant frequency positions using said reference symbols, for a first OFDM symbol;
(b) determining a plurality of frequency correlations for said equidistant frequency positions for said first OFDM symbol;
(c) repeating steps (a) and (b) for a plurality of subsequent OFDM symbols; and
(d) linearly combining said plurality of frequency correlations for said plurality of OFDM symbols obtained in steps (a) through (c), for obtaining the sample timing offset indication wherein the linear combining uses non-zero weights only,
wherein said adapting of OFDM symbol timing comprises:
extracting a sign from said sample timing offset indication; and
shifting the OFDM symbol timing in a direction opposite to the extracted sign.

7. The method of claim 6, wherein an amount of shifting is a function of an absolute value of the determined sample timing offset indication.

8. The method of claim 6, wherein an amount of shifting is a preset value.

9. The method of claim 6, wherein said shifting comprises:
varying a length of a discarded OFDM cyclic prefix to be increased or reduced according to a determined time tracking indicator in a DFT sample extraction unit while keeping constant an A/D converter sample clock at a fixed frequency.

10. The method of claim 6, wherein said shifting comprises:
modifying a sample clock of an A/D converter of an OFDM receiver for a specific amount of time.

11. A method for time synchronization tracking in an orthogonal frequency division multiplexing (OFDM) receiver, the method comprising:
obtaining a discrete Fourier transformation (DFT) output vector;
determining a sample timing offset indication using reference symbols that are extracted from the obtained DFT output vector; and
adapting an OFDM symbol timing using said determined sample timing offset indication, wherein said determining step further comprises:
(a) estimating a channel transfer function at equidistant frequency positions using said reference symbols, for a first OFDM symbol;
(b) determining a plurality of frequency correlations for said equidistant frequency positions for said first OFDM symbol;
(c) repeating steps (a) and (b) for a plurality of subsequent OFDM symbols; and
(d) linearly combining said plurality of frequency correlations for said plurality of OFDM symbols obtained in steps (a) through (c), for obtaining the sample timing offset indication wherein the linear combining uses non-zero weights only, and
applying a sample frequency offset value to a sample rate converter of an OFDM receiver for a specific amount of time.

12. An orthogonal frequency division multiplexing (OFDM) receiver circuit arrangement, comprising:
a guard interval removal unit configured to extract blocks as long as a DFT length from a received complex digital baseband signal;
a DFT unit configured to yield a vector of received data and reference symbols in a frequency domain;
a channel estimation unit configured to compute a channel estimate of a DFT output vector;
a data equalization unit configured to equalize a plurality of data symbols of said DFT output vector using said channel estimate;
a symbol demapping unit configured to obtain soft bits from the data symbols; and
a time tracking indicator unit configured to determine a sampling clock offset indication using reference symbols that are extracted from the DFT output vector;
wherein said time tracking indicator unit is adapted to perform the steps of:
(a) estimating a channel transfer function at equidistant frequency positions using said reference symbols, for a first OFDM symbol;

(b) determining a plurality of frequency correlations for said equidistant frequency positions for said OFDM symbol;
(c) repeating steps (a) and (b) for a plurality of subsequent OFDM symbols;
(d) linearly combining said plurality of frequency correlations for said plurality of OFDM symbols obtained in steps (a) through (c), for obtaining said sampling clock offset indication wherein the linear combining uses non-zero weights only,
wherein said time tracking indicator unit is configured to perform step (d), for each set of frequency correlations determined for said plurality of OFDM symbols in steps (b) and (c), by weighting said plurality of determined frequency correlations with a weighting pattern and calculating a sum of said weighted frequency correlations, and then averaging the calculated sums for said plurality of OFDM symbols to obtain said sampling clock offset indication.

13. The receiver circuit arrangement of claim 12, wherein said time tracking indicator unit is configured to use as equidistant frequency positions in step (a) a combined set of directly estimated reference symbols and time-interpolated reference symbols equidistantly positioned within a row grid of frequency positions.

14. The receiver circuit arrangement of claim 12, wherein a spacing of said equidistant frequency positions is smaller than a ratio of a length of a DFT window to a length of a guard interval of said OFDM symbol.

15. An orthogonal frequency division multiplexing (OFDM) receiver circuit arrangement, comprising:
a guard interval removal unit configured to extract blocks as long as a DFT length from a received complex digital baseband signal;
a DFT unit configured to yield a vector of received data and reference symbols in a frequency domain;
a channel estimation unit configured to compute a channel estimate of a DFT output vector;
a data equalization unit configured to equalize a plurality of data symbols of said DFT output vector using said channel estimate;
a symbol demapping unit configured to obtain soft bits from the data symbols; and
a time tracking indicator unit configured to determine a sampling clock offset indication using reference symbols that are extracted from the DFT output vector;
wherein said time tracking indicator unit is adapted to perform the steps of:
(a) estimating a channel transfer function at equidistant frequency positions using said reference symbols, for a first OFDM symbol;
(b) determining a plurality of frequency correlations for said equidistant frequency positions for said OFDM symbol;
(c) repeating steps (a) and (b) for a plurality of subsequent OFDM symbols;
(d) linearly combining said plurality of frequency correlations for said plurality of OFDM symbols obtained in steps (a) through (c), for obtaining said sampling clock offset indication wherein the linear combining uses non-zero weights only,
wherein said time tracking indicator unit is configured to perform step (d) by averaging each of said plurality of frequency correlations determined for said plurality of OFDM symbols in steps (b) and (c), and then weighting said plurality of averaged frequency correlations with a weighting pattern and calculating a sum of said averaged and weighted frequency correlations to obtain said sampling clock offset indication.

16. An orthogonal frequency division multiplexing (OFDM) receiver circuit arrangement, comprising:
a guard interval removal unit configured to extract blocks as long as a DFT length from a received complex digital baseband signal;
a DFT unit configured to yield a vector of received data and reference symbols in a frequency domain;
a channel estimation unit configured to compute a channel estimate of a DFT output vector;
a data equalization unit configured to equalize a plurality of data symbols of said DFT output vector using said channel estimate;
a symbol demapping unit configured to obtain soft bits from the data symbols; and
a time tracking indicator unit configured to determine a sampling clock offset indication using reference symbols that are extracted from the DFT output vector;
wherein said time tracking indicator unit is adapted to perform the steps of:
(a) estimating a channel transfer function at equidistant frequency positions using said reference symbols, for a first OFDM symbol;
(b) determining a plurality of frequency correlations for said equidistant frequency positions for said OFDM symbol;
(c) repeating steps (a) and (b) for a plurality of subsequent OFDM symbols;
(d) linearly combining said plurality of frequency correlations for said plurality of OFDM symbols obtained in steps (a) through (c), for obtaining said sampling clock offset indication wherein the linear combining uses non-zero weights only,
wherein said time tracking indicator unit is configured to use as a weighting pattern employed in step (c) a pattern that comprises, in a time domain representation, a monotonically increasing portion including a substantially zero portion with a length slightly smaller than the length of a guard interval of said OFDM symbol, and flanked by a respective monotonically decreasing portion.

17. The receiver circuit arrangement of claim 16, further comprising:
a DFT sample extraction unit; and
a loop filter, the loop filter being configured to generate a time position signal from said extracted sign for altering the time position within said sample extraction unit to adjust the timing.

18. The receiver circuit arrangement of claim 16, further comprising
a sample rate converter;
a DFT sample extraction unit; and
a loop filter, the loop filter being configured to generate a sample frequency offset signal from said extracted sign and to apply the generated sample frequency offset signal to said sample rate converter for altering the sample frequency thereof to adjust the timing.

19. The receiver circuit arrangement of claim 16, further comprising:
a DFT sample extraction unit;
a sample clock generator;
an analog to digital converter; and
a loop filter, the loop filter being configured to generate a sample frequency offset signal from said extracted sign and to apply the generated sample frequency offset signal to said sample clock generator for altering the sample frequency thereof adjust the timing.

20. An orthogonal frequency division multiplexing (OFDM) receiver circuit arrangement, comprising:

a guard interval removal unit configured to extract blocks as long as a DFT length from a received complex digital baseband signal;

a DFT unit configured to yield a vector of received data and reference symbols in a frequency domain;

a channel estimation unit configured to compute a channel estimate of a DFT output vector;

a data equalization unit configured to equalize a plurality of data symbols of said DFT output vector using said channel estimate;

a symbol demapping unit configured to obtain soft bits from the data symbols; and a time tracking indicator unit configured to determine a sampling clock offset indication using reference symbols that are extracted from the DFT output vector; wherein said time tracking indicator unit is adapted to perform the steps of:

(a) estimating a channel transfer function at equidistant frequency positions using said reference symbols, for a first OFDM symbol;

(b) determining a plurality of frequency correlations for said equidistant frequency positions for said OFDM symbol;

(c) repeating steps (a) and (b) for a plurality of subsequent OFDM symbols;

(d) linearly combining said plurality of frequency correlations for said plurality of OFDM symbols obtained in steps (a) through (c), for obtaining said sampling clock offset indication wherein the linear combining uses non-zero weights only, wherein said time tracking indicator unit is further configured to extract a sign from said sampling clock offset indication.

* * * * *